United States Patent Office 3,331,859
Patented July 18, 1967

---

3,331,859
3-AROYL-(2-ARYLMETHYL)CHROMONES
Kenneth Robert Huffman and Edwin Fisher Ullman, Stamford, Conn., assignors to American Cyanamid Company, Stamford, Conn., a corporation of Maine
No Drawing. Filed Dec. 14, 1964, Ser. No. 418,328
15 Claims. (Cl. 260—345.2)

This application is a continuation-in-part of application Ser. No. 377,394 filed June 23, 1964, now abandoned.

The present invention relates to the synthesis of a new class of photochromic compounds. More particularly, the instant discovery concerns 3-aroyl-(2-arylmethyl)chromones of the following general formula

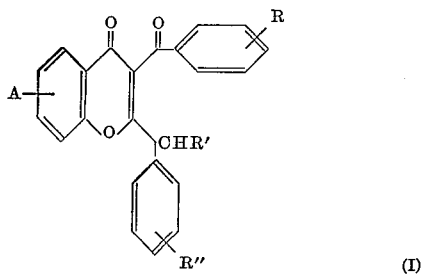

wherein A is selected from lower alkyl, phenyl, lower alkyl-substituted phenyl, hydrogen, hydroxy, lower alkoxy, lower alkyl thio, cyano, nitro, di-lower alkylamino, halogen, —$CF_3$, and like inert substituents; R is selected from lower alkyl, hydroxy, lower alkoxy, lower alkyl thio, cyano, nitro, di-lower alkylamino, halogen, —$CF_3$, H, and other like inert substituents; R' represents lower alkyl, hydrogen, phenyl, and substituted phenyl, typical inert substituents for phenyl being hydroxy, lower alkoxy, cyano, nitro, di-lower alkylamino, halogen, —$CF_3$, and the like; and R" is hydrogen, lower alkyl, hydroxy, lower alkoxy, lower alkyl thio, cyano, nitro, di-lower alkylamino, halogen, —$CF_3$, and the like.

The compounds represented by the generic formula above are prepared in several ways. The following generic equation is typical: (A)

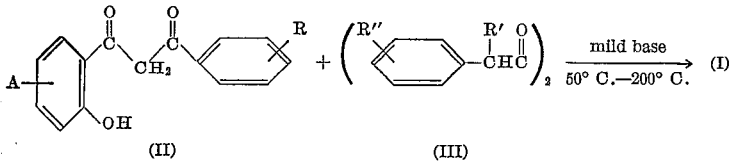

wherein A, R, R' and R" are the same as above, with the exclusion of hydroxy for A, R and R". Typical bases are tri(lower alkyl) amines, such as triethylamine and tributylamine; NaH;

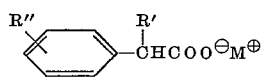

(in which R' and R" are the same as above, with the exclusion of hydroxy for R" and M+ is a metal ion, such as an alkali metal ion, or an ammonium ion, such as a tri (lower)alkyl ammonium and tetra(lower)alkyl ammonium); and the like.

A second method involves the preparation in situ of reactant III, above, viz., a substituted phenyl acetic anhydride, as follows: (B)

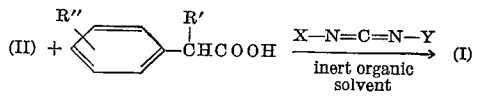

wherein R' and R" are the same as in Equation A, above, and X and Y may each represent lower alkyl, cycloalkyl, (e.g., cyclohexyl, cyclopentyl) and phenyl.

This latter reaction is best carried out at temperatures in the range of 0° C.–150° C. in the presence of an inert organic solvent, as indicated, such as carbon disulfide, an aromatic hydrocarbon (e.g., benzene, toluene, xylene and the like), an ether (diethyl ether, dipropyl ether, dibutyl ether, tetrahydrofuran, dioxane, and the like). In the reactions defined above, the ratio of the reactants is not critical and there is no great advantage in operating with a stoichiometric excess of any of the reactants with respect to any of the others. A great excess is impractical but reaction to yield desired product will take place.

If desired in procedure (A), above, a suitable inert organic solvent of the type described for procedure (B) may be used. Reaction times may vary from less than 5 minutes to more than 10 hours, some reactions taking place almost instantaneously, depending upon reactants and temperature.

Any of the procedures defined above may be run at atmospheric, subatmospheric or superatmospheric pressure. Likewise, the procedures may be batch, semi-continuous or continuous and the sequence of addition of the reactants to one another is not critical.

The present invention will best be understood from the following illustrative examples:

*Example I.—3-benzoyl-2-benzylchromone*

A mixture of 12.0 grams of 1-(2'-hydroxyphenyl)-3-phenyl-1,3-propanedione (0.50 mole), 14.0 grams of phenylacetic anhydride (0.055 mole) and 5.5 grams triethylamine (0.055 mole) is heated on a steam bath for 1½ hours. A clear viscous oil is formed after about 5 minutes. The oil is cooled, dissolved in 1:1 ether-benzene and washed three times with saturated aqueous sodium bicarbonate solution. After drying over sodium sulfate, the solvent is removed leaving an oil which is crystallized from ether-petroleum ether giving pale yellow crystals having a melting point of 115° C.–120° C. Yield 10.0 grams.

One recrystallization from ethanol gave 8.9 grams of almost colorless product crystals of 3-benzoyl-2-benzylchromone having a melting point of 121° C.–122.5° C.

The ether-petroleum ether mother liquor is evaporated, and the remaining oil taken up in ethanol. On cooling, 0.6 gram of yellow solid came out, An infrared spectrum shows this to be starting material 1-(2'-hydroxyphenyl) 3-phenyl-1,3-propane dione.

The filtrate, on standing overnight, gives pale yellow gummy crystals. Recrystallization from ethanol gives more produce, i.e., pale yellow crystals having a melting point of 121° C.–123° C.

*Analysis.*—Calculated for $C_{23}H_{16}O_3$: C, 81.16; H, 4.74. Found: C, 80.83; H, 4.78.

*Example II*

The procedure of Example I, above, is repeated in every essential respect, except that the mixture of reactants is fused over a 160° C. oil bath for 1 hour. The solid obtained from trituration of the mass with ether is recrystallized from ethanol after treatment with charcoal and the product 3-benzoyl-2-benzylchromone obtained.

*Example III.—3-benzoyl-2-benzylchromone*

A mixture of 16.0 grams of 1-(2'-hydroxyphenyl) - 3-penyl-1,3-propanedione (0.066 mole), 16.9 grams of phenylacetic anhydride (0.066 mole), and 10.5 grams of sodium phenylacetate (0.066 mole) is fused at 160° C. On cooling, water is added and the resulting organic layer taken up in ether. The ether layer is then washed with sodium bicarbonate solution, dried over anhydrous magnesium sulfate, and then evaporated. The oil obtained is triturated with ether and a colorless solid is obtained. Recrystallization from ethanol yields about 10 grams of colorless prisms, i.e., product 3-benzoyl-2-benzylchromone.

*Example IV.—3-benzoyl-2-benzychromone*

To a solution of 1.20 grams of 1-(2'-hydroxyphenyl) 3-phenyl-1,3-propanedione (0.005 mole) and 0.68 gram of phenylacetic acid (0.005 mole) in 25 milliliters of methylene chloride is added 2.06 grams N,N'-dicyclohexylcarbodiimide (0.01 mole) slowly, with shaking. A while solid begins to come out of solution after a short time. The resulting mixture is allowed to stand overnight. After filtering off the solid (0.9 gram of N,N'-dicyclohexylurea), the solvent is evaporated off. The oil obtained is dissolved in ether, and the ether layer washed three times with sodium carbonate solution, then with water, dried over anhydrous magnesium sulfate and evaporated. The resulting oil is taken up in ethanol and dilute aqueous hydrochloric acid slowly added with stirring to destroy any remaining carbodiimide. The solid that preipitates is extracted with benzene and the extract evaporated to dryness. Crystallization of the residue from a small amount of ethanol gives 3-benzoyl-2-benzylchromone, melting point 123° C.–124.2° C.

*Example V.—3-benzoyl-2-diphenylmethylchromone*

A mixture of 4.1 grams of 1-(2'-hydroxyphenyl)-3-phenyl-1,3-propanedione (0.017 mole), 7.5 grams of diphenylacetic anhydride (0.017 mole) and 1.72 grams triethylamine (0.019 mole) is fused at an oil bath temperature of about 158° C. for 1 hour. The condenser used to prevent loss of triethylamine is removed at the end of the heating period to permit evaporation of the triethylamine. The resulting organic material is taken up in ether and washed with saturated sodium bicarbonate solution, then with water, dried over anhydrous magnesium sulfate, and evaporated. An amber-colored oil was obtained. Trituration of the oil with ether-petroleum ether yields a crude white solid having a melting point of 154.3° C.–156° C. Recrystallization from ethanol gives colorless clustered needles having a melting point of 154.5° C.–157.5° C., and identified as 3-benzoyl-2-diphenylmethylchromone.

*Analysis.*—Calculated for $C_{29}H_{20}O_3$: C, 83.63; H, 4.84. Found: C, 84.16; 84.06; H, 4.81, 4.7.

*Example VI.—3-benzoyl - 2 - (para-methoxyphenylmethyl)chromone*

A mixture of 12.0 grams of 1-(2'-hydroxyphenyl)-3-phenyl - 1,3 - propanedione (0.05 mole), 15.7 grams of paramethoxyphenylacetic anhydride (0.05 mole) and 7.0 grams of triethylamine (0.055 mole) is fused in a flask equipped with a condenser at an oil bath temperature of 160° C. for one hour. The condenser is removed and the material cooled. Ether is added, and the ether layer washed with saturated sodium bicarbonate solution and then with water, dried over anhydrous magnesium sulfate and evaporated. Recrystallization of the residue from benzene gives 3-benzoyl-2-(para-methoxyphenylmethyl) chromone, melting point 182° C.–183° C.

*Analysis.*—Calculated for $C_{24}H_{18}O_4$: C, 77.82; H, 4.90. Found: C, 78.02; H, 4.91.

*Example VII.—3-benzoyl-2-(para-hydroxyphenylmethyl)chromone*

A solution of 3 - benzoyl-2 - (para-methoxyphenylmethyl)chromone, 30 milliliters of 48% hydrobromic acid, and 40 milliliters of glacial acetate acid are refluxed for 3 hours. On cooling, the solution is poured into icewater with stirring. A yellow solid comes out of solution and is filtered off. Recrystallization from ethanol yields 1.5 grams of 3-benzoyl - 2-(para-hydroxyphenylmethyl) chromone, melting point 210.5° C.–211.5° C.

*Analysis.*—Calculated for $C_{23}H_{16}O_4$: C, 77.51; H, 4.53. Found: C, 77.05, 77.35; H, 4.65, 4.71.

As is evident from this example, the hydroxy-substituted products of Formula I, above, are prepared from the corresponding alkoxy-substituted products of Formula I.

*Example VIII.—3-(para-cyanobenzoyl)-2-benzylchromone*

A mixture of 3.0 grams of 1-(2'-hydroxyphenyl)-3-(para-cyanophenyl)-1,3-propanedione (0.011 mole), 3.81 grams phenylacetic anhydride (0.015 mole) and 1.5 gram of triethylamine (2.06 milliliters, 0.015 mole) are heated over a steam bath for 16.5 hours. The orange-red mixture is taken up in benzene, and the benzene layer is washed with saturated sodium bicarbonate solution and then with water, dried over anhydrous magnesium sulfate and evaporated. The resulting oil on trituration with methanol yields a solid which on recrystallization from benzene gives product 3-(para-cyanobenzoyl)-2-benzylchromone having a melting point of 187° C.–188° C.

*Analysis.*—Calculated for $C_{24}H_{15}O_3N$: C, 78.89; H, 4.14; N, 3.83. Found: C, 79.28, 79.04; H, 4.28, 4.47; N, 4.24, 4.15.

*Example IX.—3-(para-nitrobenzoyl)-2-benzylchromone*

A mixture of 3.5 grams of 1-(2'-hydroxyphenyl)-3-(para-nitrophenyl)-1,3-propanedione (0.012 mole), 3.8 grams phenylacetic anhydride and 5.0 milliliters of triethylamine is refluxed over a steam bath for 1.5 hours. Benzene is added and the mixture washed with saturated sodium bicarbonate solution and then with water. A solid precipitates on standing which is filtered off and recrystallized from benzene to give pale yellow prisms, melting point 204.5° C.–206.5° C., and identified as 3-(para-nitrobenzoyl)-2-benzylchromone.

*Analysis.*—Calculated for $C_{23}H_{15}O_5N$: C, 71.68; H, 3.92; N, 3.64. Found: C, 71.22; H, 3.98; N, 4.04, 4.08.

The following Table I further illustrates the present invention:

TABLE I

| Example No. | Procedure of Example | (II) + (III) A | R | R' | R'' | Molar Ratio II:III | Temp., °C | Mild Base | Solvent | Corresponding Product (I) |
|---|---|---|---|---|---|---|---|---|---|---|
| X | III | 3'-propyl | Paraethoxy | H | H | 1.5:1 | 100 | Sodium phenyl acetate. | Dioxane | [A, R, R' and R'' in the resulting product (I) correspond to A, R, R' and R'' in reactants (II) and (III)]. |
| XI | I | 4'-methoxy | H | Phenyl | Para-CN | 3:1 | 140 | Triethylamine. | Xylene | |
| XII | I | 5'-Cl | Orthobutyl | Parabromophenyl | Ortho-Cl | 2:1 | 110 | NaH | Toluene | |
| XIII | VI | 6'-CF₃ | H | Metamethoxyphenyl | Meta-CF₃ | 2:1 | 150 | Sodium 2-(metamethoxyphenyl)-2-(metatrifluoromethylphenyl)-acetate. | | |
| XIV | I | 4'-xylyl | H | Orthocyanophenyl | H | 1:2 | 170 | Sodium orthocyanophenyl acetate. | | |
| XV | I | 3'-phenyl | Paranitro | H | Paranitro | 3:1 | 80 | Potassium paranitrophenylacetate. | | |
| XVI | I | H | Orthocyano | Orthocyanophenyl | H | 2.5:1 | 80 | Triethylamine. | Carbon tetrachloride. | |
| XVII | III | 6'-propoxy | Br | H | H | 1:1 | 165 | ...do... | | |
| XVIII | III | H | Paradiethylaminophenyl | H | Paradiethylamino | 5:1 | 110 | ...do... | Xylene | |
| XIX | I | 5'-cyano | Meta-CF₃ | Ethyl | H | 1:1 | 130 | Lithium-2-phenylbutyrate. | | |
| XX | I | H | Dipropylamino | Paramethoxyphenyl | H | 1:1 | 100 | Tetramethylammonium-2-(paramethoxyphenyl)-2-phenylacetate. | | |
| XXI | III | H | H | Orthonitrophenyl | H | 2:1 | 150 | Triethylammonium-2-(orthonitrophenyl)-2-phenylacetate. | Anisole | |
| XXII | I | H | H | p-CF₃—C₆H₄— | H | 1:1 | 175 | Triethylamine. | | |
| XXIII | I | H | H | Paradibutylaminophenyl. | Para-Cl | 1:1 | 160 | Sodium 2-(paradibutylaminophenyl)-2-(parachlorophenyl)-acetate. | | |
| XXIV | III | H | Para-cyano | H | Para-CH₃ | 1:1 | 160 | Sodium p-methylbenzoate. | | |
| XXV | I | 6'-CE₃S— | H | H | H | 1:1 | 100 | Triethylamine. | | |
| XXVI | I | H | Meta-CH₃S— | H | H | 1:1.5 | 125 | Tri-n-propylamine. | | |
| XXVII | I | H | H | Para-CH₃S—C₆H₅ | Para-CH₃S— | 1:1.5 | 150 | Tri-n-butylamine. | | |

*Examples XXVIII–XXXII*

Examples X–XIV, above, are repeated in every essential respect with the exception that in each example reactant III is formed in situ (as in Example IV, supra) from the corresponding acid

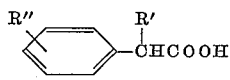

carbodiimide, X—N=C=N—Y (wherein X and Y are the same as defined above in Equation B):

TABLE II

| Reactants of Example | Temp., °C | Carbodiimide | |
|---|---|---|---|
| | | X | Y |
| XXVIII | X | 24 | Propyl | Propyl. |
| XXIX | XI | 50 | Phenyl | Phenyl. |
| XXX | XII | 85 | Cyclopentyl | Cyclopentyl. |
| XXXI | XIII | 19 | Butyl | Butyl. |
| XXXII | XIV | 60 | Phenyl | Propyl. |

The products from these Examples XXVIII to XXXII correspond exactly to the products of Examples X to XIV, respectively. Obviously, this same in situ procedure of Equation (B) may be used in any of the remaining examples, above, or similar examples within the purview of the present invention, to produce the corresponding products of Formula I.

*Example XXXIII.—Preparation of 3-benzoyl-2-benzyl-7-dimethylaminochromone*

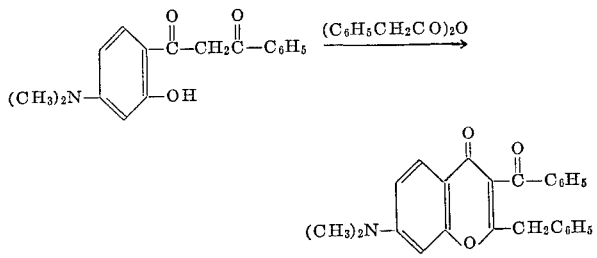

A mixture of 2.8 grams of 1-(2'-hydroxy-4'-dimethylaminophenyl)-3-phenyl-1,3 - propanedione, 3.2 grams of phenylacetic anhydride and 1.7 milliliters of triethylamine is heated on the steam bath for 7 hours. The cooled mixture is diluted with benzene and filtered to remove 0.75 gram of unreacted starting material [1-(2'-hydroxy-4'-dimethylaminophenyl)-3-phenyl-1,3-propanedione]. The filtrate is washed with 5% aqueous sodium carbonate, dried over sodium sulfate and evaporated to give a red gum which is crystallized from methylene chloride-petroleum ether.

Repeated recrystallization from ethanol gives the pure 3-benzoyl-2-benzyl-7 - dimethylaminochromone as nearly colorless needles, melting point 185° C.–186° C.

The products of the present invention have many and varied uses and applications. For instance, a benzene (acetone, or other suitable solvent can be used) solution is preparing containing 20% by weight solids (95% polymethylmethacrylate and 5% 3 - benzoyl - 2 - benzylchromone) and a thin film prepared on glass in a conventional manner. The thus-coated glass may be used as a sun glass (i.e., sun glasses), in contrast reduction of photographic negatives, or the like, since the film reversibly turns yellow orange when irradiated with ultraviolet light. These use and applications are not limited to 3-benzoyl-2-benzylchromone, in view of the similar photosensitivity exhibited by the class of compounds represented by Formula I, above.

Clearly the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

We claim:
1. A 3-aroyl-(2-arylmethyl)chromone of the formula

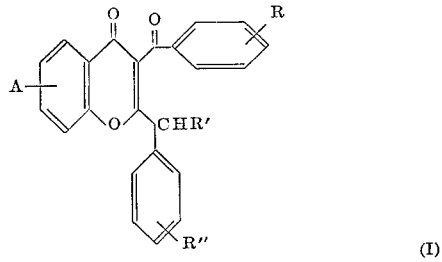

wherein
A is a member selected from the group consisting of lower alkyl, phenyl, lower alkyl-substituted phenyl, hydrogen, hydroxy, lower alkoxy, lower alkyl thio, cyano, nitro, di-lower alkylamino, halogen and —CF$_3$;

R is a member selected from the group consisting of lower alkyl, hydroxy, lower alkoxy, lower alkyl thio, cyano, nitro, di-lower alkyl-amino, halogen, —CF$_3$ and hydrogen;
R' represents a member selected from the group consisting of lower alkyl, hydrogen, phenyl, and substituted phenyl, said substituents for phenyl being selected from the group consisting of hydroxy, lower alkoxy, cyano, nitro, di-lower alkylamino, halogen and —CF$_3$;
and R" is a member selected from the group consisting of hydrogen, lower alkyl, hydroxy, lower alkoxy, lower alkyl thio, cyano, nitro, di-lower alkylamino, halogen and —CF$_3$.

2. 3-benzoyl-2-benzylchromone.
3. 3-benzoyl-2-diphenylmethylchromone.
4. 3-benzoyl-2-(para-methoxyphenylmethyl)chromone.
5. 3-benzoyl-2-(para-hydroxyphenylmethyl)chromone.
6. 3-(para-cyanobenzoyl)-2-benzylchromone.
7. 3-(para-nitrobenzoyl)-2-benzylchromone.
8. 3-benzoyl-2-benzyl-7-dimethylaminochromone.
9. A method of producing a 3-aroyl-(2-arylmethyl)chromone of the formula

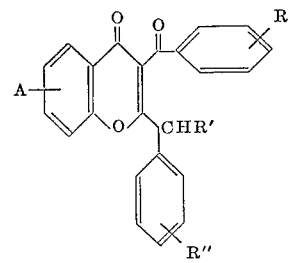

which comprises bringing into reactive contact, in the presence of a mild base, a reactant of the formula

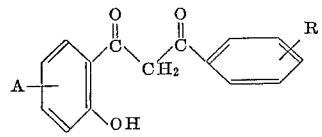

and an anhydride of the formula

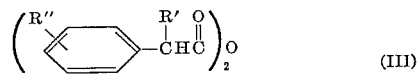

wherein
A in the above formulae is a member selected from the group consisting of lower alkyl, phenyl, lower alkyl-substituted phenyl, hydrogen, lower alkoxy, lower alkyl thio, cyano, nitro, di-lower alkylamino, halogen and —CF$_3$;
R is a member selected from the group consisting of lower alkyl, lower alkoxy, lower alkyl, thio, cyano, nitro, di-lower alkylamino, halogen, —CF$_3$ and hydrogen;
R' represents a member selected from the group consisting of lower alkyl, hydrogen, phenyl, and substituted phenyl, said substituents for phenyl being selected from the group consisting of hydroxy, lower alkoxy, cyano, nitro, di-lower alkylamino, halogen and —CF$_3$;
R" is a member selected from the group consisting of hydrogen, lower alkyl, lower alkoxy, lower alkyl thio, cyano, nitro, di-lower alkylamino, halogen and —CF$_3$.

10. The process of claim 9 in which reaction is made to take place at a temperature in the range of 50° C. to 200° C.
11. The process of claim 9 wherein the mild base is a tri(lower)alkylamine.

12. The process of claim 9 wherein the mild base is NaH.
13. The process of claim 9 wherein the mild base is

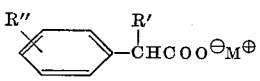

wherein
   $M^{\oplus}$ is a member selected from the group consisting of a metal ion and an ammonium ion; and
   R and R″ are the same as recited in claim 9, above.
14. The process of claim 9 wherein reactant (III) therein is prepared in situ from the corresponding acid of the anhydride (III) and a carbodiimide; X—N=C=N—Y wherein X and Y each represent a member selected from the group consisting of lower alkyl, cycloalkyl and phenyl, and reaction is made to take place at a temperature in the range of 0° C. to 150° C.
15. The process of claim 9 in which reaction is made to take place in the presence of an inert organic solvent.

References Cited

UNITED STATES PATENTS 2,769,015   10/1956   Mentzer _____ 260—345.2

WALTER A. MODANCE, *Primary Examiner.*

JOHN M. FORD, *Assistant Examiner.*